June 16, 1942.　　　A. W. MALL　　　2,286,292
SPINDLE ASSEMBLY
Filed Jan. 8, 1940　　　2 Sheets-Sheet 1

INVENTOR
ARTHUR WILLIAM MALL
BY *Lynn H. Latta*
ATTORNEY

June 16, 1942.　　A. W. MALL　　2,286,292
SPINDLE ASSEMBLY
Filed Jan. 8, 1940　　2 Sheets-Sheet 2
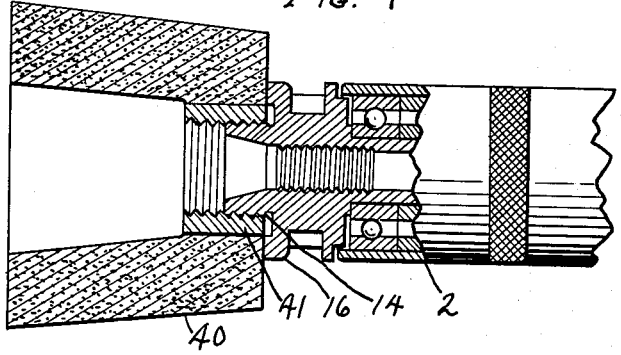
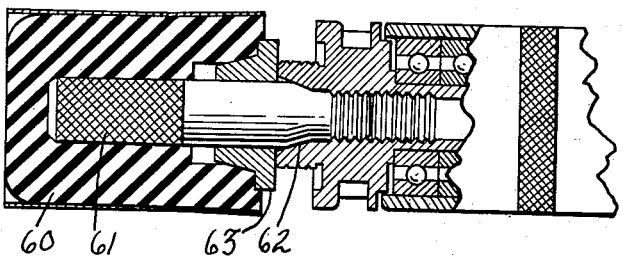
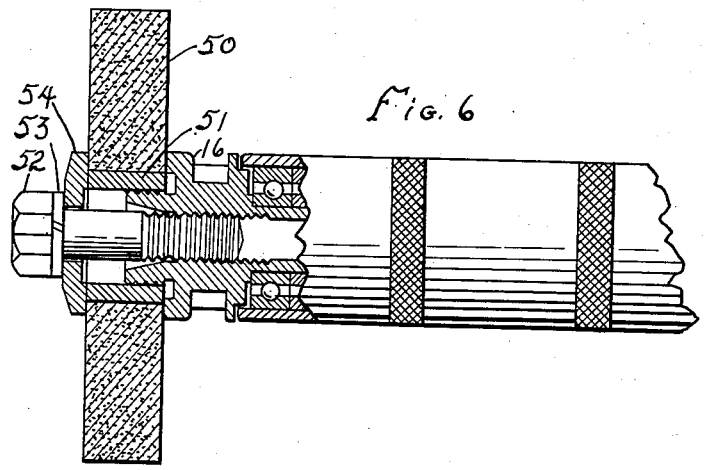
INVENTOR
Arthur William Mall
BY Lynn H Latta
ATTORNEY Patented June 16, 1942

2,286,292

UNITED STATES PATENT OFFICE 2,286,292

SPINDLE ASSEMBLY

Arthur William Mall, Flossmoor, Ill.

Application January 8, 1940, Serial No. 313,015

3 Claims. (Cl. 279—1)

My invention relates to an improved spindle assembly.

The principal object of my invention is to provide a spindle with a spindle shaft having formed integrally therewith a head portion, which is universally adaptable to different types of tool attachments.

Another object is to provide the head portion with means for centering the different tool attachments axially with the spindle shaft so as to provide a true running tool.

In accomplishing these objects I have provided a spindle shaft which is inexpensive and need not be replaced when changing from one type of tool attachment to another. The spindle shaft with its head portion is formed of a single machined part.

Other objects and advantages of the invention will be more apparent from the following description and the accompanying drawings forming a part of this specification in which:

Fig. 4 is another view of the spindle with a third type of tool attachment;

Fig. 5 shows a fourth type of tool attachment used with the spindle; and

Fig. 6 shows still another tool attachment used with the spindle.

In general my invention comprises a spindle housing 2, a spindle shaft 3 journaled in bearings 4 mounted in the housing and a tool attachment driven by the spindle. I prefer to use a motor driven flexible shaft (not shown) for driving the spindle.

Figure 1:
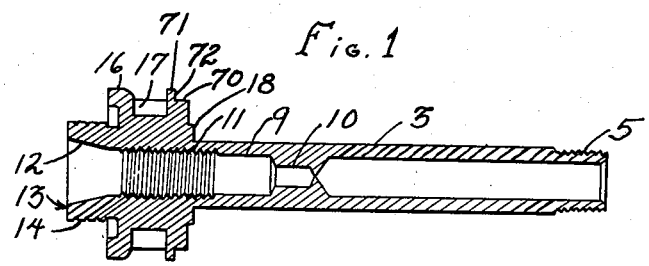
Fig. 1 is a sectional view of the spindle shaft and head.

Referring particularly to Fig. 1, I have shown the spindle shaft 3 which is formed of a single machined part having at one end a threaded portion 5 to which a drive nut 6 is attached. The drive nut is provided with a double keyway 7 adapted to receive a corresponding double splined core tip (not shown) which is secured to the end of a flexible drive shaft (not shown).

The tool attaching end of the spindle shaft comprises a head portion generally referred to at 8, which is adaptable to a number of different types of tool attachments as shown in Figs. 2 to 6. The spindle shaft is provided with a bore 9. The inner end of the bore has a reduced region 10 and the intermediate region of the bore is threaded at 11. The outer end region of the bore is flared at 12. The free end of the spindle shaft is formed with a nipple 13 which is threaded externally at 14. The crests of these external threads are machined off so as to provide a smooth cylindrical peripheral surface for accurately centering a tool attachment such as in Fig. 6. At the base of the nipple 13 I have provided an annular flange 16 against which various tool attachments are adapted to abut. The flange 16 provides a supporting and centering means for tool attachments such as those shown in Figs. 3, 4 and 6. At 17 a wrench gripping surface allows tightening of the tool attachments to a spindle shaft. At 18 I have provided an annular shoulder against which the bearings 4 abut. A second annular shoulder 70, the periphery of which is spaced a few thousandths of an inch from the internal surface of the housing 2, projects into the interior of the housing and a third annular shoulder 71 extends radially beyond the walls of housing 2. The radial face 72 of shoulder 71 is spaced a few thousandths of an inch from the free end of housing 2. This particular construction affords an effective sealing means for preventing dust from getting into the bearings.

Figure 2:
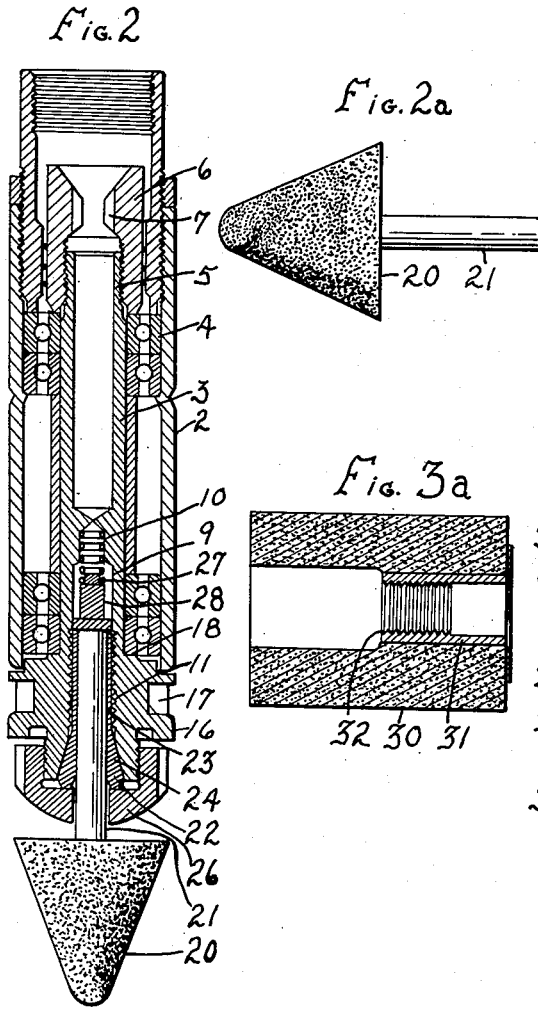
Fig. 2 is a sectional view of the spindle assembly showing one form of tool attachment.
Figure 2A:
Fig. 2a shows the tool attachment used in Fig. 2.

The tool attachment shown in Fig. 2a comprises a small grinding wheel 20 having a smooth surfaced cylindrical stem 21 extending therefrom. With this type of tool attachment a collet type chuck 22 is employed to secure the grinding wheel to the spindle shaft. The collet consists of an elongated cylindrical portion 23 terminating in a conical head that is split axially to form a plurality of jaws 24. The jaws 24 are adapted to engage the corresponding tapered region 12 of the bore 9. A clamp nut 26 is threaded onto the nipple 13. When the stem 21 of the grinding wheel 20 is inserted into the spindle shaft, the nut 26 is tightened against the collet 22 urging it into the bore of the spindle shaft. As the collet is urged inwardly the tapered region 12 of the bore, engaging the jaws 24 of the collet wedges the jaws against the stem 21 assuring a firm connection between the grinding wheel and the spindle shaft. The reduced inner end of the bore 9 receives a compression spring 27 which urges a plunger 28 against the ends of the grinding wheel stem 21 and the collet 22 urging them both outwardly to a released position when the clamp nut 26 is loosened.

Figure 3:
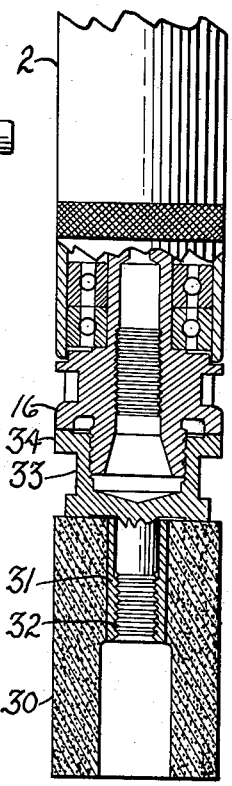
Fig. 3 is a partial sectional view of the same spindle with a different type of tool attachment.
Figure 3A:
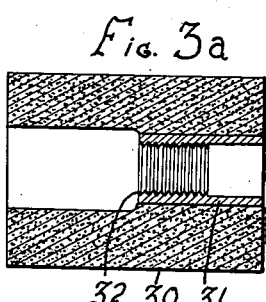
Fig. 3a shows the tool attachment used in Fig. 3.

The arrangement shown in Fig. 3 employs the type of tool attachment shown in Fig. 3a, comprising a grinding wheel 30 and a steel insert 31 internally threaded at 32 to receive a corresponding threaded adapter nut 33. The adapter nut 33 is provided with an annular flange 34 which abuts the flange 16 when the adapter nut is threaded onto the nipple 13.

The arrangement shown in Fig. 4 employs the type of tool attachment as shown in Fig. 4, comprising a grinding wheel 40 with an internally threaded steel insert 41 which is adapted to engage the corresponding threaded portion 14 of the hub 13. The flange 16 abuts against the back face of the grinding wheel, acting as a supporting and centering means assuring a true running grinding wheel.

In Fig. 6 a different type of tool attachment is shown, comprising a flat type grinding wheel 50 with a steel arbor 51 located centrally therein. The arbor is adapted to snugly receive the square threaded surface 15 of the nipple 13 with the face of the grinding wheel abutting against the flange 16. A bolt 52 secures the grinding wheel to the spindle shaft by means of a lock washer 53 and a clamp washer 54. The bolt is threaded into the internal threaded portion 11 of the spindle shaft. In Fig. 5 another type of tool attachment is shown comprising a flexible and expansible sanding drum 60 which forms the subject of my co-pending application, Serial No. 308,931. A shaft 61 is anchored in the interior of the rubber drum 60 preferably by bonding and is threaded into the internally threaded portion 11 of the spindle shaft. The shaft 61 is provided with a tapered portion 62 which engages the corresponding tapered bore 12. The tapered bore 12 acts as a stop assuring against threading the sanding drum shaft too far into the spindle shaft whereby excessive expansion of the drum by means of collar 63 would result. The tapered bore 12 also acts as a centering means for assuring a true running grinding wheel.

The invention provides a spindle member which is adapted to function as a chuck, as shown in Fig. 2, or a threaded socket, as in Figs. 5 and 6 or as a nipple type connector as in Figs. 3 and 4. The threaded region of the bore 9 is adapted to serve in the first instance as a pilot opening for the collet 22 and, in the second instance, as the threaded socket. The flaring end region 12 of the bore 9 is adapted in the first case to react with the collet jaws for closing them against the tool stem, and in the second case, to accurately center the tool stem which is received therein. The nipple 13 serves, in the arrangement shown in Fig. 2, as a means onto which the nut 26 may be threaded, and in the arrangement shown in Figs. 3 and 4, as a means to which the tool or tool adapter may be attached. In the arrangement shown in Fig. 6, it serves as a pilot member for reception in the bore of a grinding wheel, the connection between the tool and spindle being made through the medium of a securing element extended through the nipple. The flange 16 is adapted to locate against the face of the tool or an adapter, whether the attachment is through the nipple or a separate element extended through the nipple.

Having thus described my invention what I claim is:

1. As an article of manufacture, a tool holding spindle shaft for a spindle assembly, comprising an elongated cylindrical stem adapted to receive a driving member, a head integral with the elongated stem and adapted to accommodate removable tool attachments, an axial bore extending through the head and having a threaded region adapted to receive a threaded securing element or a stem of a tool, a flared end region opening into the free end of the head, said flared end region having a continuously uninterrupted surface area and being adapted to coact with a chuck collet for closing the jaws thereof or to coact with a conical piloting shoulder of a tool stem, said head being formed at its free end with an externally threaded nipple, the external threads of said nipple having a crest clearance reduced from normal to form a smooth cylindrical surface for piloting a tool thereon, a radially outwardly extending annular shoulder defining the base of said nipple, adapted to locate against a radial face of a tool or adapter threaded or piloted on said nipple, the inner end of said head being formed, respectively, with a radially inwardly extending annular surface, an axially extending cylindrical surface, a second radially inwardly extending annular surface, a second axially extending cylindrical surface, and a third radially inwardly extending annular surface.

2. An article of manufacture as set forth in claim 1 wherein wrench gripping surfaces are formed on the exterior of the head.

3. An article of manufacture as defined by claim 1 wherein the axial bore extending through the head terminates in a second axial bore of less diameter than the first axial bore.

ARTHUR WILLIAM MALL.